INVENTORS.
John V. Goode, Jr.
Zack J. Moore
BY
AGENT

INVENTORS.
John V. Goode, Jr.
Zack J. Moore
BY Earl D. Ayers
AGENT

United States Patent Office 3,552,185
Patented Jan. 5, 1971

3,552,185
THERMAL CONDUCTIVITY APPARATUS
John V. Goode, Jr., and Zack J. Moore, Lake Jackson, Tex., assignors to The Dow Chemical Company, Midland, Mich., a corporation of Delaware
Filed Oct. 9, 1968, Ser. No. 766,181
Int. Cl. G01n 25/18
U.S. Cl. 73—15                               7 Claims

ABSTRACT OF THE DISCLOSURE

This invention comprises an apparatus employing thermoelectric heat pumps to effect the required level of temperature control necessary to provide an adequate measurement of the thermal conductivity of insulating foams.

The method of establishing a fixed thermal difference across the sample is accomplished by placing the sample between two surfaces whose temperatures are accurately controlled. The cold plate temperature is accurately set and controlled by a thermoelectric heat pump driven by a high gain proportional controller. The hot plate is also operated at an accurately controlled temperature, heat being supplied from a close-coupled proportionally controlled low mass heater. The heat flow through the sample is measured with a heat flow transducer which produces an EMF that is proportional to the heat flow per unit time and area through the foam. The EMF thus derived is voltage divided by a slide wire which is mechanically coupled to an in-place thickness indicator, and the appropriate analog corrections are made to provide a signal for direct digital read-out of "K."

BACKGROUND OF THE INVENTION

This invention relates to apparatus for measuring the thermal conductivity of insulating material, and particularly to apparatus for measuring the thermal conductivity of sheets of foamed sheet material.

The determination of thermal conductivity ($k$-factor) of insulating materials has been the subject of considerable study and research effort. The accepted standard method of test for thermal conductivity of insulation materials utilizes the "guarded hot plate" principle and is described by ASTM. The analysis of foam materials by the guarded plate method has been successfully done for many years. This method is quite accurate and should be accepted as the standard. However, measurements of thermal conductivity by the ASTM method are very time consuming and the equipment expensive. The need for a simplified low cost thermal conductivity tester capable of making fairly rapid determinations has long been recognized.

Accordingly, a principal object of this invention is to provide an improved, faster to use apparatus for determining the thermal conductivity of sheet-like insulation material.

Another object of this invention is to provide apparatus for making a direct reading of the thermal conductivity of insulating materials.

A further object of this invention is to provide improved, reliable, and generally compact apparatus for measuring the thermal conductivity of insulating materials.

In accordance with this invention there is provided apparatus for determining the thermal conductivity of a homogeneous material which presses, at predetermined pressure, a heated plate against a thermopile (or heat flow transducer) located between the heated plate and one surface of a sample block and presses a cooled plate utilizing a thermo-electric heat pump against an opposed surface of the sample block. The temperature of the plates are precisely controlled. The heat flow through the sample is measured with a heat flow transducer which produces an EMF that is proportional to the heat flow per unit time and area through the foam. The EMF thus derived is voltage divided by a slide wire which is mechanically coupled to an in-place thickness indicator, and the appropriate analog corrections are made to provide a signal for direct digital read-out of "K."

The invention, as well as additional objects and advantages thereof will best be understood when the following detailed description is read in connection with the accompanying drawings, in which.

Figure 1:
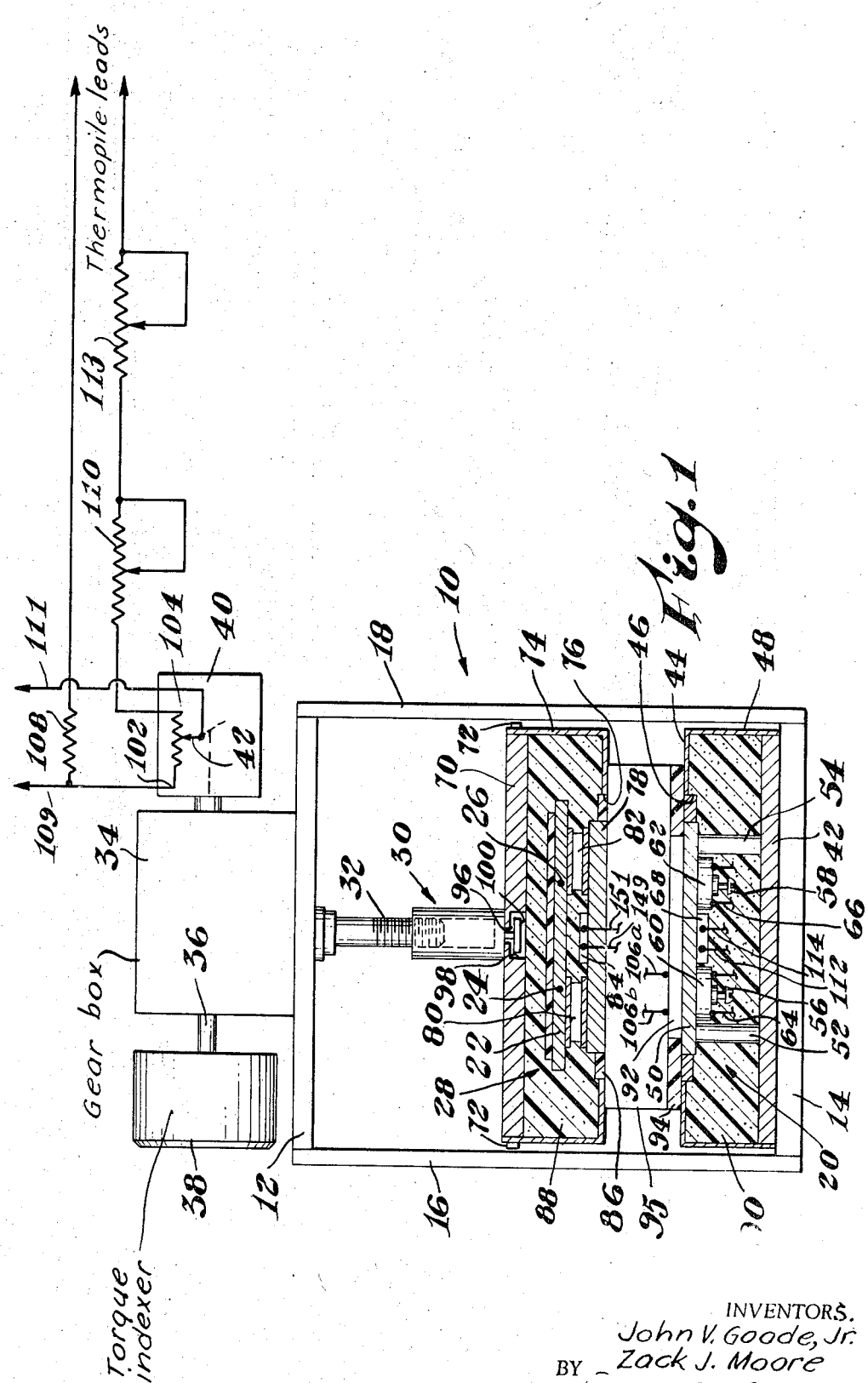
FIG. 1 is a side elevational view, partly in section and schematic form, of apparatus in accordance with this invention.

Referring to the drawings, and particularly to FIG. 1 there is shown thermal conductivity measuring apparatus, indicated generally by the numeral 10, composed of a frame having a top plate 12, bottom plate 14, and opposed side walls 16, 18. A so-called hot plate assembly, indicated generally by the numeral 20 is disposed contiguous to the bottom plate 14 and between the bottom and top plates.

A so-called cold plate assembly, indicated generally by the numeral 28, is disposed above the hot plate assembly 20 and is coupled to a threaded assembly 30 including a bolt 32 and gear box 34 for raising and lowering the cold plate assembly 28. The gear box is coupled by means of a shaft 36 to a torque indexer (or torque limiting) knob 38 and to a multiple turn potentiometer 40 whereby the rotation of the shaft 36 controls movement of the movable contact 42 of the potentiometer.

The hot plate assembly comprises a base plate 41, a cover plate 44 having a top which includes a bore 46 and has sides 48 which are coupled to the base plate 42. A flat plate 50, the "hot" plate, which is round and of substantially uniform thickness, is coupled to and supported on rigid thermally insulating tubular support elements 52, 54 which are fixedly coupled to the base plate 42.

Attached to the side of the plate 50 which faces the base plate 42 by means of screws 56, 58 are spaced apart button type heaters 60, 62 which are energized electrically through leads 64, 66 respectively. A resistance thermometer 68 is coupled to the same side of the plate 50 as are the button type heaters 60, 62. The plate 50 is disposed symmetrically within the bore 46, there being spacing between the housing and the edge of the plate 50. The top of the plate 50 is generally in the same plane as the top of the housing.

The space between the edge of the hot plate 50 and the rim of the bore 46 is filled with a thermally insulating material such as room temperature vulcanizing rubber. The remainder of the space between the base plate 42, the hot plate 50 and the housing 48 is filled with thermally insulating material 90, usually foamed-in-place polyurethane.

A thermopile 92, disposed in plate-like form and composed of a multiplicity of junctions (usually about 270) is coupled to the upper surface of the hot plate 50, an annular shaped sheet of insulating material 94, such as a polyethylene sheet of the same thickness as the thickness of the thermopile 92, closely surrounds the thermopile 92 and extends away from the thermopile for a distance at least equalling the dimensions of the block of sample material 96 disposed between the hot and cold plates.

The cold plate assembly comprises a generally flat base plate 70 having end walls which fit closely adjacent to the walls 16, 18 of the frame. A housing section 74 having a U-shaped transverse cross-sectional configuration is secured along its upper edges to the base plate 70. Attachment may be made by means of nylon bolts 72 whose heads provide low-friction guide elements to prevent the metal housing from scraping against the frame as the cold plate assembly is raised and lowered.

A round "cold" plate 78 having parallel opposed surfaces is disposed symmetrically in and has its edges spaced from the edge of a bore 76 disposed opposite to the bore 46 in the cover plate 44. The lower surface of the plate 78 is substantially co-planar with respect to the bottom of the housing 74. The dimensions of the cold plate are (at least usually) the same as the dimensions of the hot plate.

A pair of thermoelectric heat pumps 80, 82 are coupled to the plate 78 on the side which faces away from the hot plate 50, the pumps 80, 82 being spaced from one another.

A resistance thermometer 84 is coupled to the cold plate 78 adjacent to the pumps 80, 82. A heat sink element 22, which is plate-like in outer configuration, is coupled to the heat pumps 80, 82. The heat sink element contains a coolant circulation coil, indicated more or less diagrammatically by the tubes 24, 26 which are adapted to be coupled to a suitable source of circulating heat-transfer fluid (not shown).

The space between the outer edge of the cold plate 78 and the wall of the bore 76 is filled with a thermal insulation material 86 such as a room temperature vulcanizing rubber.

The remainder of the space between the base plate 70, the housing 74 and cold plate 78 is filled with thermally insulating material 88. The insulating material 86 is usually a foamed-in-place polyurethane foamed material.

The base plate 70 of the cold plate assembly 28 has a bore 96, usually at the intersection of its diagonals, the bore 96 having a counter-bored part 98 which opens towards the cold plate 78. The threaded assembly 30 is somewhat loosely coupled to the base plate 70 by means of a bolt 100. Thus, if the opposed walls of the sample 95 are not parallel, the cold plate may adjust to fit tightly against the surface of the sample 95.

As mentioned previously, the shaft 36 is coupled to the movable contact of the multi-turn potentiometer 40. The fixed end terminals 102, 104 are coupled to the leads 106 from the thermopile 92, the terminal 102 being coupled through fixed resistor 108 to lead 106a, and the terminal 104 being coupled through series connected rheostats 110, 112 to the lead 106b.

Leads 109, 111 are coupled at one end to the fixed terminal 102 and to the movable element 42, respectively, and at their other ends to a digital voltmeter or other suitable readout device (not shown).

Figure 2:
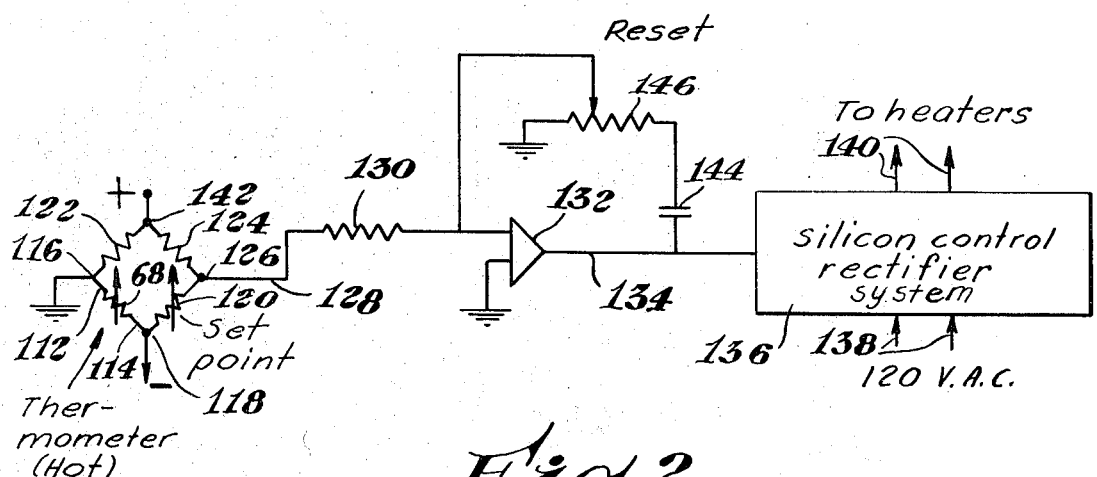
FIG. 2 is a simplified schematic diagram of a control system used in heating the "hot" plate of the apparatus in FIG. 1.

Referring now to FIG. 2, there is shown a simplified schematic and block diagram of a control system suitable for controlling the heaters 60, 62. Leads 113, 114 from the resistance thermometer 68 are coupled to terminals 116 and 118, respectively, placing the temperature varying resistance thermometer 68 in one leg of a bridge circuit which contains a set point variable resistance element 120 and fixed resistance elements 122, 124. The terminal 116 is grounded and a negative potential from a suitable source (not shown) is coupled to terminal 118. Terminal 126, to which an end of resistor 124 and set point variable resistance element 120 are attached, is coupled through lead 128 and fixed resistance element 130 to the input of an operational amplifier 132 whose output is coupled via lead 134 to a silicon control rectifier system 136 into which a suitable potential from an alternating current source (not shown) is coupled via leads 138. The output leads from the rectifier system 136 are coupled via leads 140 to the leads 64, 66 shown in FIG. 1. The terminal 142, to which an end of the resistance element 124 and an end of the resistance element 122 are connected, is coupled to a positive potential from a suitable source (not shown).

A feedback loop comprising capacitor 144 and variable resistor 146 is coupled from the output of the amplifier 132 to the input of that amplifier.

Figure 2A:
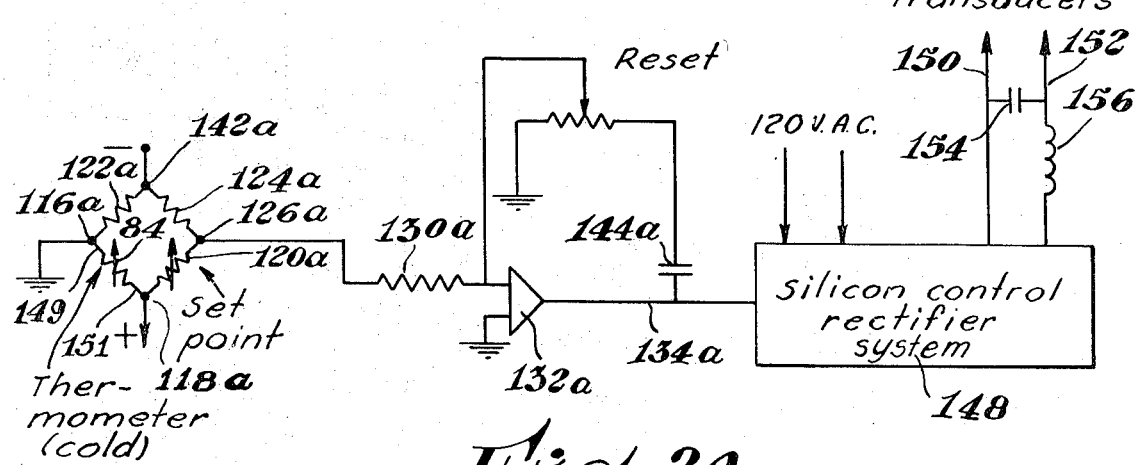
FIG. 2a is a simplified schematic diagram of a control system used in cooling the "cold" plate of the apparatus in FIG. 1.

The circuit of FIG. 2a is similar to that of FIG. 2, and insofar as applicable, corresponding parts, indicated by an a following the numerals, are shown for the two circuits. (The polarities of the two control circuits are reversed since one, FIG. 2, is controlling the "hot" resistance thermometer, while the other, FIG. 2a, is controlling the "cold" resistance thermometer.) It should be noted that the "cold" resistance thermometer 84 is in the bridge circuit of FIG. 2a. A different silicon control rectifier system 148 is coupled to the output 134a of the amplifier 132a. A suitable alternating current power source (not shown) is coupled to the control rectifier system 148. The output of the control rectifier system 148 is delivered through leads 150, 152 from the filter composed of capacitor 154 and inductance 156.

Figure 3:
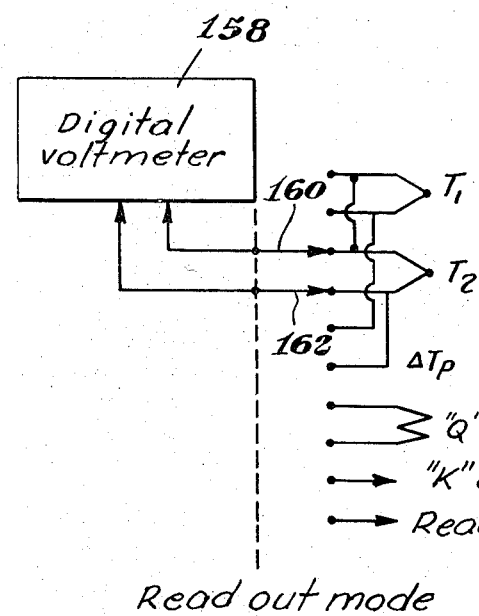
FIG. 3 is a simplified schematic diagram of the read-out circuit of this invention.

FIG. 3 shows a simplified schematic diagram wherein a digital voltmeter 158 is switched by means of movable contacts 160, 162 to read the cold plate temperature ($T_1$); hot plate temperature ($T_2$); the temperature difference between the hot and cold plates ($\Delta T_p$); the output of the thermopile 92 (Q meter reading), and the K factor analog read out.

In operation, the sampling material 96 whose K factor is to be determined is placed on the heated plate 50 and the torque indexer knob 38 is advanced until the slipping of the knob 38 indicates that the desired pressure is being applied to the sample 96. The rotation of the shaft 36 causes the bolt 32 to rotate, raising or lowering the cold plate assembly 28. At the same time, the rotation of the shaft causes rotation of the movable contact 42 of the potentiomeer 40, to which it is coupled; the positioning of the contact 42 along the resistance element of the potentiometer being a function of the thickness of the sample 96.

The temperature of the hot plate 50 is controlled at a set value by the circuit shown in FIG. 2 in conjunction with the heaters 60, 62.

The temperature of the cold plate 78 is maintained at a predetermined temperature by means of the heat pumps 80, 82 and the circuitry of FIG. 2a.

The heat flow through the sample is measured by means of the thermopile 92 whose output is a voltage which is proportional to the heat flow per unit time and area through the foam. The output of thermopile 92 is coupled by leads 106a, 106b (through resistors 108, 110 and 112) across the multiple turn potentiometer 40 which is mechanically coupled to the thickness indicating means, the divided output of the thermopile 92, which takes into account the thickness of the sample, appearing across leads 109, 111 as the K analog readout potential.

As mentioned in connection with FIG. 3, the K analog readout is read across a digital voltmeter 158, which may be a servo-balancing, potentiometer-type digital voltmeter, for example.

The measuring arrangement shown in FIG. 3 provides a convenient means for checking various sources of difficulty which could result in a failure of performance of the instrument. As the sample thickness increases, the signal diminishes (for a given K-foam) and the tap on the potentiometer 40 moves in a direction (towards potentiometer 110) to increase the output across leads 109, 111.

The value of resistance 108 is selected to represent the sample thickness between zero and the lower limit of travel of the cold plate (about ¾ inch).

The value of potentiometer 112 is selected to have the required effect on the output; as K increases the error due to the $\Delta T_m$ across the thermopile increases. By setting potentiometer 112 to the first approximation of K, the answer will be skewed by the required amount to give the second approximation. Potentiometer 110 is used to calibrate the circuit with a standard sample.

The following accepted calculations show the derivation of the K value:

$$K\left(\frac{\text{Btu inch}}{°\text{F/ft.}^2/\text{hr.}}\right) = \frac{E_v V_t}{\Delta T_f}$$

where:

$\Delta T_p = T_1 - T_2$
$\Delta T_m = E_v/7.5^*$
$\Delta T_f = \Delta T_p - \Delta T_m$
$V$ = heat flow meter calibration constant
$t$ = average sample thickness
$\Delta T_p$ = temperature difference between hot and cold surfaces
$\Delta T_m$ = temperature difference across heat meter (° F.)
$\Delta T_f$ = temperature difference across sample
$T_1$ = temperature of hot surface
$T_2$ = temperature of cold surface

* This is a constant, C, which is determined by the materials of construction of the thermopile.

it is possible to make a number of basic assumptions.
(1) $T_1$ and $T_2$ are accurately and reliably controlled, therefore $\Delta T_p$ is constant.
(2) For any one heat flow meter, a single V will be constant.
(3) K is a linear function of thickness, therefore, thickness may be analoged with a slide wire, etc.
(4) For K values above 0.15, a second approximation can be made in the analog read-out to keep the results within the required limits ($\pm 0.001$K). This second approximation corrects for the changes in $\Delta T_f$ that occur with the change in K of the sample. (Example: If the first approximation of K is 0.100, the true value is 0.101; however, if the first approximation is 0.400, the true value is 0.417).

By accepting these assumptions and complying with the stated limitations, it then becomes possible to provide a direct K read-out.

With reference to the mechanical features of the apparatus, the torque measuring means 38 should respond in the 0.2–0.5 pound inch range. Thrust bearings may be used to absorb positive vertical thrust and thus improve the torque to thrust conversion efficiency.

Pressure applied to the sample and the mechanical linkage between the plate assembly and the analog thickness pot are critical control parameters.

The heat pumps 80, 82 in one instrument are Cambion type 3951–1 thermoelectric modules which are close coupled to both the cold plate 78 and the heat sink 22. Contacting surfaces were lapped and a silicone type heat sink compound was used to further assure good thermal bonding between the modules, the heat sink and the cold plate.

All attachments to both the hot and cold plates are made by silver soldering threaded studs directly to the plates.

The material used to insulate the interior of the housing in the cold plate part, plus the rubber 86 also serves to seal the interior of the cold plate part and to minimize moisture condensation on the internal cold surfaces.

The heaters 60, 62 in the above-mentioned one instrument are micro 20 watt button heaters. The button heaters, as well as the resistance thermometers 68, 84 are also thermally close coupled to their respective hot or cold plates.

The cold plate dimensions in the above-mentioned instrument are identical to those of the hot plate.

What is claimed is:
1. Apparatus for use in determining the thermal conductivity of insulating materials, comprising a frame having within its structure a hot plate assembly including a hot plate having a flat surface and a cold plate assembly, having a cold plate surface, said surfaces facing each other, said assemblies being separated from each other and adapted to receive a sample sheet of insulating material between said surfaces, means for maintaining the temperatures of said hot and cold plates at fixed temperatures, mechanical means coupled to one of said assemblies for raising and lowering one of said assemblies and for maintaining a predetermined pressure on a sample sheet disposed between said assemblies, heat flow transducer means having an electrical output, said heat flow transducer means being thermally coupled to said hot plate surface and to said sample when said sample is disposed between said assemblies under said predetermined pressure, said output of said heat flow transducer being applied across an electrical variable resistance device, said electrical resistance device having a movable tap coupled to said mechanical means to thereby provide an output signal between said tap and a fixed terminal which is a function of the thickness of said sample and heat flow through said sample.

2. Apparatus in accordance with claim 1, wherein said hot plate assembly comprises a hot plate supported generally parallel to and spaced from a base by thermally insulating elements, said plate having electrical heating elements coupled to the plate surface facing said base, a temperature sensing element coupled to the side of said plate to which said heating elements are coupled, and housing and thermal insulation means surrounding the periphery of said plate and extending to said base, and electronic control means coupled to said heating elements and said temperature sensing element for maintaining said hot plate at a predetermined temperature.

3. Apparatus in accordance with claim 1, wherein said cold plate assembly comprises a cold plate having a flat surface facing said hot plate assembly, said plate having at least one thermoelectric transducer module and a temperature sensing element thermally coupled thereto and to a heat sink, the periphery of said plate being surrounded but spaced from a housing which encloses said transducer modules, said temperature element and said heat sink, and thermal insulation material disposed around said modules, temperature sensing element and heat sink, and electronic means coupled to said transducer modules and said temperature sensing element for accurately maintaining said cold plate at a predetermined temperature.

4. Apparatus in accordance with claim 1, wherein said mechanical means is coupled to said cold plate assembly.

5. Apparatus in accordance with claim 1, wherein said heat flow transducer is a thermopile.

6. Apparatus in accordance with claim 1, wherein calibration and error correction potentiometers are connected in series with the output of said heat flow transducer.

7. Apparatus in accordance with claim 1, wherein a readout device is coupled across said output signal which is a function of the thickness of said sample and heat flow through said sample.

References Cited
UNITED STATES PATENTS
3,263,485   8/1966   Mahmoodi _____ 73—15

JAMES J. GILL, Primary Examiner

H. GOLDSTEIN, Assistant Examiner